(12) United States Patent
De Vito et al.

(10) Patent No.: US 6,452,616 B1
(45) Date of Patent: *Sep. 17, 2002

(54) METHOD AND DEVICE FOR LOADING A USER INTERFACE

(75) Inventors: Mario De Vito, Geveze; Louis Gregoire, Cassis, both of (FR)

(73) Assignee: Thomson Licensing S.A., Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,188
(22) PCT Filed: Nov. 29, 1996
(86) PCT No.: PCT/EP96/05293
  § 371 (c)(1),
  (2), (4) Date: May 1, 1998
(87) PCT Pub. No.: WO97/20431
  PCT Pub. Date: Jun. 5, 1997

(30) Foreign Application Priority Data

Nov. 30, 1995 (FR) .............................. 95/14153

(51) Int. Cl.$^7$ ............................... G06G 5/00
(52) U.S. Cl. .................. 345/825; 345/826; 725/132; 725/140; 725/152
(58) Field of Search ................ 345/825, 826, 345/716, 717, 718; 725/5, 38, 48, 49, 132, 140, 152

(56) References Cited

U.S. PATENT DOCUMENTS

| | | | | |
|---|---|---|---|---|
| 5,173,589 A | * | 12/1992 | Diehl et al. | 235/375 |
| 5,218,406 A | * | 6/1993 | Ebner | 355/205 |
| 5,367,571 A | * | 11/1994 | Bowen et al. | 380/20 |
| 5,497,418 A | * | 3/1996 | Kudelski | 380/5 |
| 5,601,435 A | * | 2/1997 | Quy | 345/501 |
| 5,835,864 A | * | 11/1998 | Dielh et al. | 455/602 |
| 5,923,759 A | * | 7/1999 | Lee | 713/159 |
| 5,990,927 A | * | 11/1999 | Hendricks et al. | 348/6 |

FOREIGN PATENT DOCUMENTS

WO  94/14284  * 6/1994

OTHER PUBLICATIONS

Aleksander T. Futro, Smart Card . . . Tool, Symposium . . . Sessions, pp. 733–742, Jun. 1993.*

Cable TV Sessions, Jun. 10–15, 1993, No. Symp. 18, Jun. 11, 1993, Postes; Telephones Et Telegraphes Suisses, "Smart Card For Conditional Access: A Marketing and Security Tool", pp. 733–742.

* cited by examiner

*Primary Examiner*—Ba Huynh
(74) *Attorney, Agent, or Firm*—J. S. Tripoli; R. D. Shedd; D. T. Shoneman

(57) ABSTRACT

A method for loading a user interface in a television system comprising a decoder and a removable smart card cooperating with the decoder, the decoder comprising a main user interface, the method comprising the steps of loading and storing by the decoder of the totality of a user interface module stored-on the smart card, the user interface module comprising data structures making reference to information destined to a user, the information being stored on the smart card, establishing by the decoder a relation between the main user interface and the stored user interface module in order to enable access by a user to the user interface module, and subsequently exchanging between the decoder and the smart card parts of the information upon commands issued by the user through the user interface module.

11 Claims, 4 Drawing Sheets

METHOD AND DEVICE FOR LOADING A USER INTERFACE

FIELD OF THE INVENTION

The invention relates to a method for loading a user interface in a television environment, in particular in a digital television system. The invention also concerns a device implementing said method, and an associated smart card. The invention may be used for example in conjunction with decoders in a conditional access television system.

BACKGROUND

It is known to use microprocessor cards ("smart cards") in Pay-TV systems. Such cards contain various data, some of which may be accessed and eventually modified by the user. For example, a card may store the access rights to a list of programs. In some systems, this information is transmitted with the video data by the broadcaster, either in specific data packets in digital transmission systems, or modulated on the analog video signal's vertical blanking interval (VBI) in analog transmission systems. Once received, the data is stored in the card. A user may wish to consult this information, although he may not be able to modify it directly. Other examples of information stored on the card are parental access codes or personal passwords. Such information may be modified by users having the corresponding authorizations.

Television decoders such as digital television decoders sold under the RCA brand for digital satellite reception in the United States are equipped with sophisticated user interfaces. User interfaces of this kind generally include a program guide and decoder feature programming tools, and make use of the graphical capabilities of the decoder to enhance user friendliness. The hierarchical structure of the user interface is presented to the user under the form of a succession of menus, or under the form of a representation of a familiar environment such as a living room or a shopping mall.

The U. S. Pat. 5,367,571 concerns a subscriber terminal with a plug-in expansion card, from which code is downloaded.

The PCT Patent application WO 94/14284 concerns a reprogrammable terminal in a television program delivery system, in which menu templates are created and transmitted to the terminal for storage.

SUMMARY OF THE INVENTION

The presentation of specific information to the user and/or the modification of this information by this user require that a part of the user interface be adapted to this information. With the evolution of services offered to the user, the nature of such information changes. The user interface may not always be adapted to process such new types of information. This is particularly true for information stored in a smart card, since such cards are by nature destined to be replaceable. New card versions may carry data concerning formerly unavailable services.

The invention concerns a method for loading a user interface in a television system comprising a decoder and a removable smart card cooperating with said decoder, said decoder comprising a main user interface, said method being characterised in that it comprises the steps of loading and storing by the decoder of the totality of a user interface module stored on said smart card, said user interface module comprising data structures making reference to information destined to a user, said information being stored on said smart card, establishing by said decoder a relation between said main user interface and said stored user interface module in order to enable access by a user to said user interface module, subsequently exchanging between said decoder and said smart card parts of said information upon commands issued by said user through said user interface module.

By storing parameters and data on a smart card, along with a user interface module to manage these parameters and data, and by establishing a relation between the user interface of a decoder and the user interface module stored on the card, a flexible solution is provided to allow evolution of a user interface.

The invention moreover permits the adaptation of the user interface module to each user, according to the data and parameters stored on a specific user's card.

The loading and storing of the user interface module is performed once and for all. No further loading of a part of the user interface module is necessary, exchanges with the smart card being limited (as far as the user interface is concerned) to that of parameter values. Access frequency and duration to the card's memory are consequently reduced during use of the user interface by the user.

According to a variant of the embodiment of the invention, said step of loading and storing is performed upon the first detection by said decoder of the presence of a smart card in said smart card interface.

Loading and storing of said module is thus performed as soon as possible when the decoder and card are functional, to free the decoder's and smart card's resources before interaction between the user and the decoder takes place.

According to a variant of the embodiment of the invention, said step of establishing said relation between said main user interface and said user interface module comprises the step of identifying at least one entry point into said user interface module and in displaying to said user in said main user interface an access to said user interface module through said at least one entry point.

According to a variant of said embodiment, said information stored in the smart card comprises user-defined data.

According to a variant of said embodiment, said user interface module is stored under the form of at least one linked list of objects.

According to a variant of said embodiment, said at least one linked list of objects comprises a series of screens, at least one screen in each linked list comprising one of said entry points.

According to a variant of said embodiment, said main user interface comprising a predetermined pointer to said at least one entry point, said step of establishing by said decoder a relation between said main user interface and said user interface module further comprises the step of allowing said user to activate a trigger to access said entry point only when said user interface module has been loaded.

According to a variant of said embodiment, said step of establishing a relation between said main user interface and said user interface module further comprises the steps of:

loading from said smart card at least one object to be linked to an object of said main user interface.

In this particular case, the main user interface does not contain in advance any preprogrammed access means which are displayed to the user. When the user interface module is downloaded, the decoder searches for objects whose function it is to establish the bridge between the main user interface and the user interface module. These objects (a specific "button" or menu choice) is displayed to the user.

The invention also concerns a smart card comprising a memory, a microprocessor and input/output means characterised in that it comprises data destined to a user, a user interface module to present said information to said user and data identifying bridges between said user interface module to a main user interface module of a device into which said smart card is inserted.

The invention also concerns a video receiver comprising a main user interface, a memory, a memory card interface and a device for entering user commands, characterised in that it comprises:

means for downloading the totality of a user interface module stored in a memory card inserted into said memory card interface, a memory for storing said user interface module, means for establishing a relation between said main user interface and said user interface module.

BRIEF DESCRIPTION OF THE DRAWING

The invention will be better understood and other characteristics will appear through the description of a non-limitative embodiment, illustrated by the figures among which.

DETAILED DESCRIPTION

The embodiment will be described in relation with a digital television environment. The invention is of course not limited to such an environment and can easily be adapted to other applications.

Figure 1:
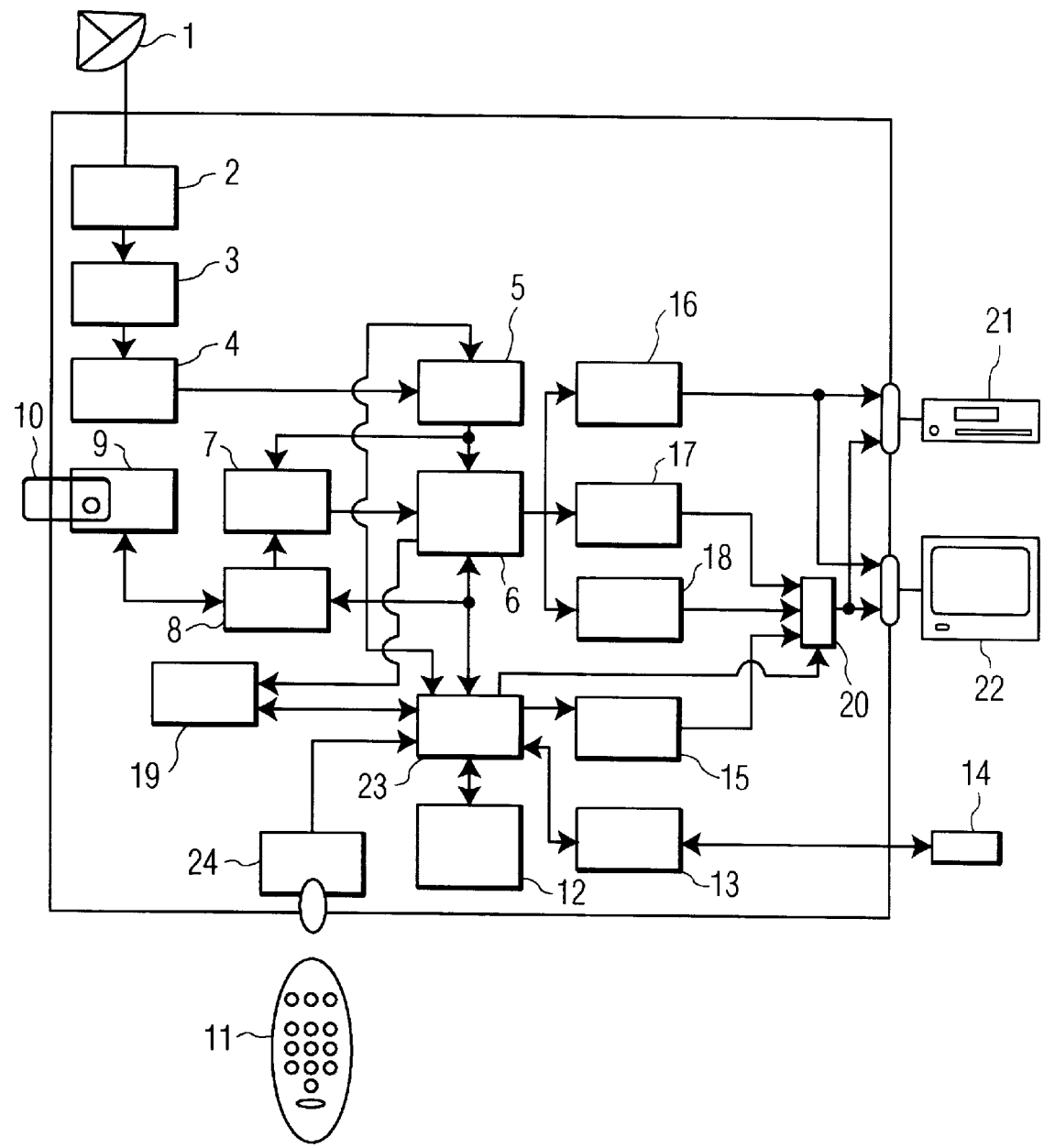
FIG. 1 is a block diagram of a television decoder.

A decoder used in a digital television system is illustrated by FIG. 1. In such a system, video, audio and other data are transmitted in data packets. This decoder is connected to an antenna 1 for receiving a signal from a broadcasting station via a satellite (not shown). The signal is transferred in a known way to a tuner 2, a demodulator 3 and an error correction circuit 4. The demodulated and corrected data packets are then transferred to a demultiplexer 5. The role of the demultiplexer 5 is to analyse the received data packets and to dispatch the content of these data packets to the appropriate applications. The demultiplexer 5 is controlled by a microprocessor 23, which programs the packet filtering parameters of the demultiplexer. The format of data packets is for example the format given in the "MPEG 2 Systems" standard.

Data packets, or parts thereof, which have been selected to be transferred to an application are stored in memory 6. The memory 6 contains a buffer zone for each application, in which data is written by the demultiplexer and read by the corresponding application.

The term "application" is used to designate software as well as hardware applications. A software application is typically a program guide, which relies on information transmitted by a broadcaster to inform the user about upcoming events. Such an application is run by the microprocessor 23. Hardware applications include an audio decoder 16, a video decoder 17, a teletext decoder 18 and a conditional access subsystem (7, 8, 9 and 10).

The microprocessor 23 is connected to a ROM 12 and a RAM or reprogrammable ROM 19. Data from the buffer memory 6 may be transferred directly to the memory 19, on instruction by the microprocessor 23.

The microprocessor is connected to an infra-red remote control interface 24, responding to signals from a remote control 11. The microprocessor also controls an on-screen display generation circuit 15, used to generate subtitles, menus and graphics.

Another feature of the decoder is a modem 13, connected to the public switched telephone network (PSTN) 14.

Video signals provided by video decoder 17, teletext decoder 18 oron-screen display generation circuit 15 are multiplexed by a multiplexer 20 under the control of microprocessor 23. The multiplexer 20 outputs a video signal to connectors connected to a video cassette recorder 21 and a television 22, along with audio signals provided by audio decoder 16.

The conditional access subsystem comprises a descrambler circuit 7, a verifier circuit 8, a smart card interface 9 and a removable smart card 10. Before being stored in buffer memory 6, scrambled data packets received by the demultiplexer 5 are first descrambled by descrambler circuit 7, provided the user possesses the corresponding access rights. These access rights are stored in the smart card 10 and are updated by the broadcaster through specific data packets destined to the conditional access subsystem. The verifier circuit 8 manages all communication between the decoder and the smart card and controls the descrambler circuit. The verifier circuit 8 also verifies the authenticity of the smart card itself, for example using the Fiat-Shamir iterative algorithm. The communication with the smart card follows the well-known ISO 7816 protocol.

The scrambling and descrambling process is the following:

At the emitter side, the broadcasting entity scrambles the data packet payload according to a given scrambling technique using a given codeword. The scrambled data is transmitted in the appropriate data packets. The codeword is cyphered and also transmitted in data packets, called Entitlement Control Messages (ECMs).

The codeword changes frequently, for example every few seconds or so.

The broadcaster also transmits access rights to individual decoders or groups of decoders. The corresponding messages are called Entitlement Management Messages or EMMs.

At the decoder side, the EMMs which correspond to a given decoder are filtered by the demultiplexer and transferred to the smart card. The smart card updates the corresponding access rights.

When a scrambled service is received, the ECMs corresponding to that service are filtered and transferred to the smart card. The smart card checks whether the access rights it has stored authorize the access to that particular service. If the answer is yes, it decyphers the codeword of the ECM and transfers it to the descrambler circuit 7 through the verifier circuit 8. If the answer is no, the microprocessor 23 is informed through verifier circuit 8, and a corresponding message is displayed to the user.

The memory 12 contains the necessary programs and data to generate a graphical user interface. The user interface of the decoder, which is launched by pressing a "Menu" button on the remote control 11, has according to the present embodiment a tree-like structure.

Internally, this structure is represented using "User Interface Objects", or UI objects. In the present embodiment, a UI object is an object which may be displayed on the screen and which has the capacity to trigger a reaction by the microprocessor when activated by the user. This activation consists for example in pressing an "OK" button of the remote control 11 when an item in a menu on the screen is highlighted. An object defines how the user interface behaves following an activation of an item on the screen.

The visual or graphical representation of the user interface structure (fonts, background graphics, etc.) will not be described in detail, except where necessary for the clarity of the description.

A linked list of objects is a group of objects in which an object may make reference to another object. For example, a particular link between a first and a second object may indicate that the second object should replace the first object on the screen if the first object is activated. Links of this kind enable the user to navigate from one object to another, following a series of predefined paths composed of links and objects.

The resident user interface of the decoder is composed of one such linked list of objects or of several independent lists.

The syntax of the main user interface composed of linked lists of objects is the following:

```
MainUI ( ){
    for (i=0;i<N;i++) UIList( )
}
UIList ( ){
    for (i=0;i<N;i++) Screen( )
}
Screen ( ) {
    Trigger;
    ExplanatoryText( );
    for (i=0;i<N;i++) List( )
}
List ( ) {
    for (i=0,i<N;i++) Choice( );
    for (i=0;i<N;i++) VariableField( );
    for (i=0;i<N;i++) InputField( )
}
Choice( ) {
    ExplanatoryText ( );
    DestinationScreenNumber;
    TriggerEvent
}
VariableField( ) {
    ExplanatoryText ( );
    GetValueFunctionPointer
}
InputField( ) {
    ExplanatoryText ( );
    ProcessValueFunctionPointer
}
ExplanatoryText( ) {
    data bytes
}
```

"MainUI" describes the whole decoder user interface, while "UIList" describes a list of linked objects.

"Screen" describes a full screen to be displayed. To move to another screen, the user has to react. The screen number is the rank of the screen in the UIList. A screen is composed of several Lists.

"Trigger" specifies the predefined event which will trigger the display of the screen. The presence of a null trigger means that the screen may be accessed only from another screen. A trigger is non-null for entry-point screens (the main menu screen described below is one example of an entry-point screen).

"List" describes a List area in a screen and its behaviour. A List is a composition of Choices, VariableFields and InputFields. A list may thus be a simple list of information such as a list of events, programs, etc. or it may be a menu in which the user may choose an option.

"Choice" describes a possible selection offered to the user and contains the destination screen to be displayed if this choice is activated.

"VariableField" describes an area of a screen in which the value of a variable is to be displayed. As an example, such a variable may be the title of an event or its duration, or a personal password. The structure also contains an explanatory text and a function call. As an example, the explanatory text for a password may be "Your Personal Password Is :", while the function call calls the subroutine destined to retrieve the value of the variable from where it may be stored. As far as the main user interface of the decoder is concerned, this is generally the memory 19.

"InputField" describes an area of the screen where the user may or should enter a value which is then processed accordingly. Again, the structure includes an explanatory text as well as a function call which triggers the processing of the requested information and eventually its storage.

"DestinationScreenNumber" is the rank of a screen in the UIList. This parameter specifies a link from one screen to another, within a given linked list.

"TriggerEvent" is a parameter which specifies whether a given linked list UIList should be exited to enter another linked list, or whether a given screen of a linked list may be called only from within that linked list. This parameter is used to leave one of the main user interface linked lists to enter a linked list of a user interface module. It defines the entry points into a linked list.

"GetValueFunctionPointer" and "ProcessValueFunctionPointer" respectively point to a function which reads the value of a variable and a function which processes a value or more generally a user input.

Each linked list may have several entry points, each point representing the beginning of a user interface session.

Figure 2:
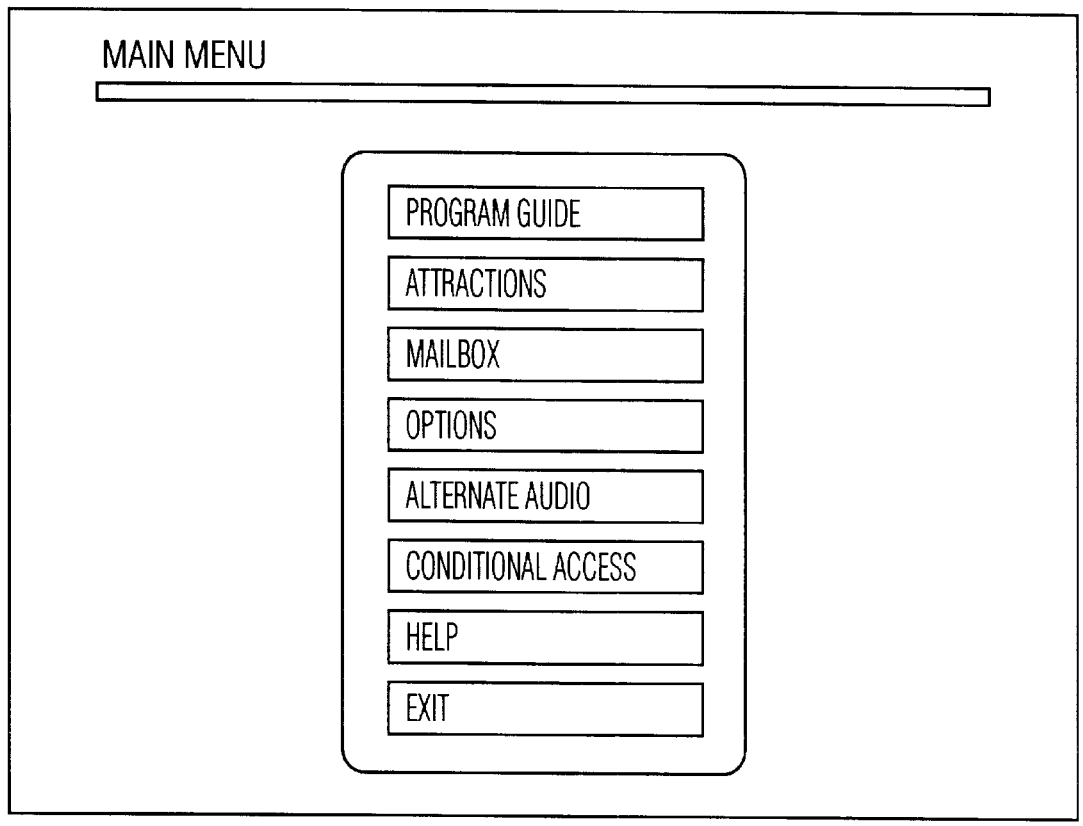
FIG. 2 is an example of a main menu of the decoder user interface.

FIG. 2 illustrates the main menu screen of a user interface, when no smart card is inserted. Using the structures defined above, this screen corresponds to a "Screen" structure, with a Trigger which corresponds to a "Menu" button of the remote control.

The title and the instructions are defined by ExplanatoryText.

The Screen possesses a single Menu with eight Choices (Program Guide, Attractions, Mailbox, Options, Alternate Audio, Conditional Access, Help, Exit). The Menu does not contain any VariableField or InputField. The DestinationScreenNumber of each Choice points to the appropriate submenu screen.

The function associated with each input field reacts to the activation of a highlighted choice. The only authorized input in this case (except for direction keys of course) is the "OK" code of the corresponding remote control button.

Choices which are unavailable are tinted in grey. This is the case for the Conditional Access item of the Menu when no smart card is present in the decoder's smart card interface.

According to the invention, the smart card contains a user interface structure related to its functions, and in particular to the variables and parameters it contains. In the rest of the description, the user interface structure stored on the card will be designated using the terms "user interface module" or simply "module", the resident user interface of the decoder being referred to as the "main user interface".

The main user interface does normally not contain structures adapted to the smart card parameters.

The structure of the user interface module depends on factors such as the type of data carried by the smart card or the applications for which the smart card is used.

In the present embodiment, the smart card is used in conjunction with the conditional access subsystem of the decoder and stores the entitlements mentioned above, as well as some user-defined information such as a series of passwords.

According to the present embodiment, entitlements are given to a user on a per program basis for a given time period. The smart card stores the identification code of a program in a network, and the beginning and end of the authorized viewing period for each identified program. The user may recall the list of programs he has subscribed to (per mail or interactively using the return channel provided by the decoder) and the corresponding periods.

The user may also wish to subscribe to a new program.

Several types of passwords are implemented, giving access to some features of the decoder.

A first password is the parental code or child lock. Using this password, a menu listing all available programs is given, each program being marked as authorized or forbidden.

A second password is necessary to access home shopping services.

Each password may be modified by a user knowing the current password.

Lastly, help screens relating to the conditional access application are available.

Figure 3:
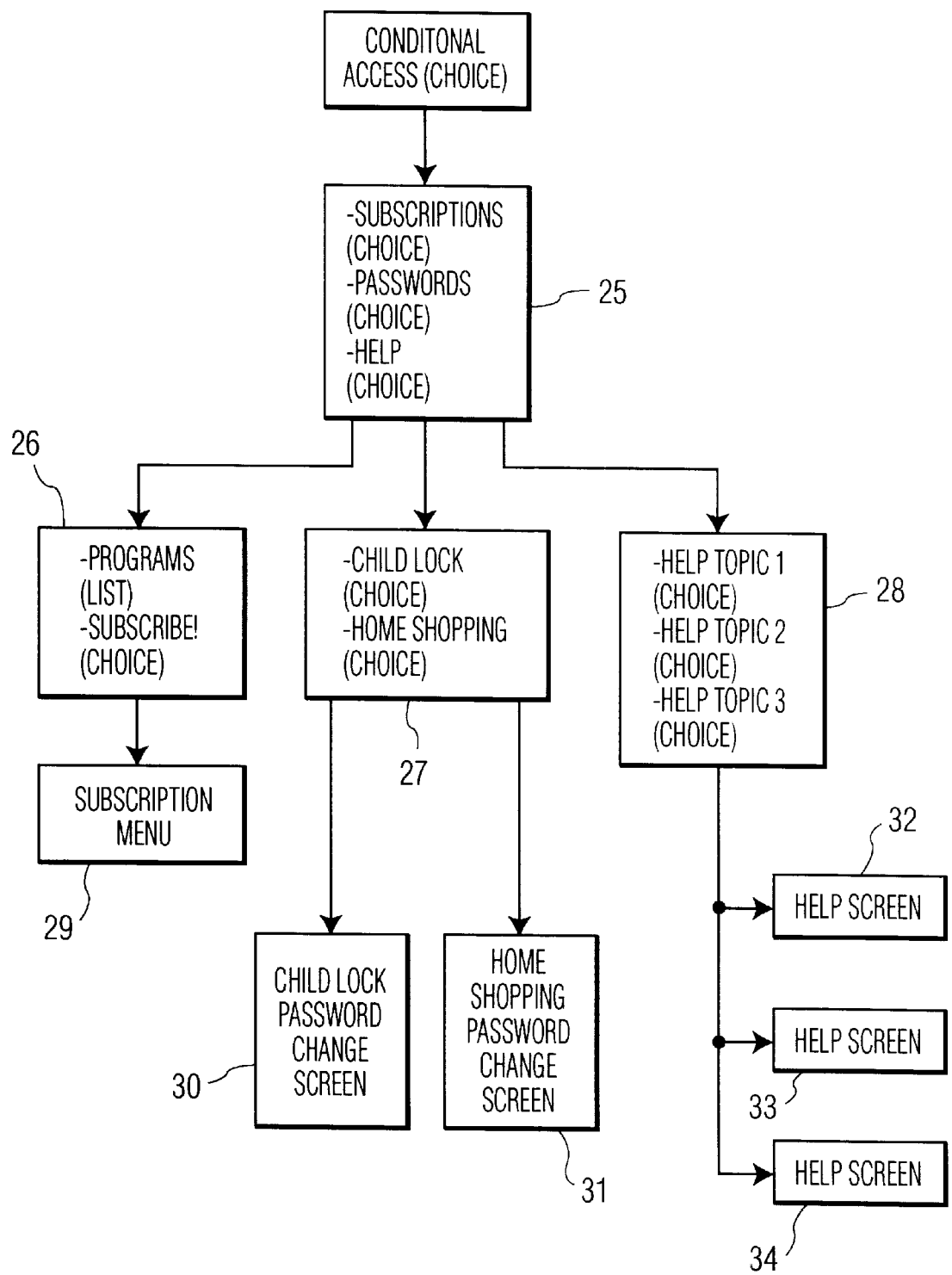
FIG. 3 is a tree diagram of the structure of the user interface module stored on a smart card and FIG. 4 is a flowchart indicating the main steps followed to integrate the user interface module into the user interface of the decoder according to the present embodiment.

FIG. 3 is a tree illustrating the user interface module screen structure corresponding to the information above.

Using the objects defined above, this structure can be translated as described below. In all, there are ten different screens:

- a conditional access main screen 25 with three choices;
- a subscription screen 26 with a list and one choice;
- a password menu screen 27 with two choices;
- a help menu screen 28 with three choices;
- a screen 29 to subscribe to a program;
- a screen 30 to change the Child Lock Password;
- a screen 31 to change the Home Shopping Password;
- three help screens 32 to 34.

The choices corresponding to "Exit" or "Go back to previous Screen" are not described.

The objects corresponding to such a user interface module can be translated using the object structures defined earlier. One excerpt from the user interface module structure will now be given with some detail.

This example concerns the access to the first screen of the user interface module, i.e. the conditional access main screen. This example has been chosen because this screen is triggered by an event which is external to the user interface module (in this case, activation of an option in the main user interface of the decoder).

```
UserInterfaceModule () {
  ScreenList                              [UIList type]
}
ScreenList () {
  ConditionalAccessMainScreen             [Screen type, rank 1]
  ProgramListScreen                       [Screen type, rank 2]
  PasswordMenuScreen                      [Screen type, rank 3]
  HelpMenuScreen                          [Screen type, rank 4]
  SubscriptionScreen                      [Screen type, rank 5]
  ChildLockPasswordChangeScreen           [Screen type, rank 6]
  HomeShoppingPasswordScreen              [Screen type, rank 7]
  HelpScreenTopic1                        [Screen type, rank 8]
  HelpScreenTopic2                        [Screen type, rank 9]
  HelpscreenTopic3                        [Screen type, rank 10]
}
ConditionalAccessMainScreen () {
  Trigger = 2                             [when choice
  ConditionalAccess is
                                          activated in main screen of
  main user
                                          interface];
  List1                                   [List type]
}
List1 () {
  MenuItemSubscription()                  [Choice type]
  MenuItemPassword()                      [Choice type]
  MenuItemHelp()                          [Choice type]
}
MenuItemSubscription(){
  Text1 ();                               [ExplanatoryText type]
  DestinationScreenNumber=2;
}
MenuItemPassword() {
  Text2 ();                               [ExplanatoryText type]
  DestinationScreenNumber=3
}
MenuItemHelp() {
  Text3 ();                               [ExplanatoryText type]
  DestinationScreenNumber=4
}
Text1() {
  "(1) Subscriptions"
}
Text2() {
  "(2) Passwords"
}
Text3() {
  "(3) Help Screens"
}
```

The screen of rank 1 is the entrance point into the user interface module. As such, the corresponding trigger (value 2) has to be implemented in the main user interface structure.

As has been said before, the null value for "Trigger" identifies screens which are not entry points into a user interface (be it the main user interface or a module).

In addition to this null value, nine different values for the "Trigger" parameter are reserved to the user interface module. Only the screens of the user interface module may be triggered using these values. The screens of the main user interface may not be triggered using these values.

The attribution of "Trigger" values is the following:

"0": The screen is not an entry point into the user interface

"1": The screen will be called by the smart card only

"2" to "9": The screen will be triggered by a predefined event of the main user interface "10" to "255": Other uses Among the last values, some values may be affected to other user interface modules in a similar manner as for the conditional access user interface module of the present embodiment.

Figure 4:
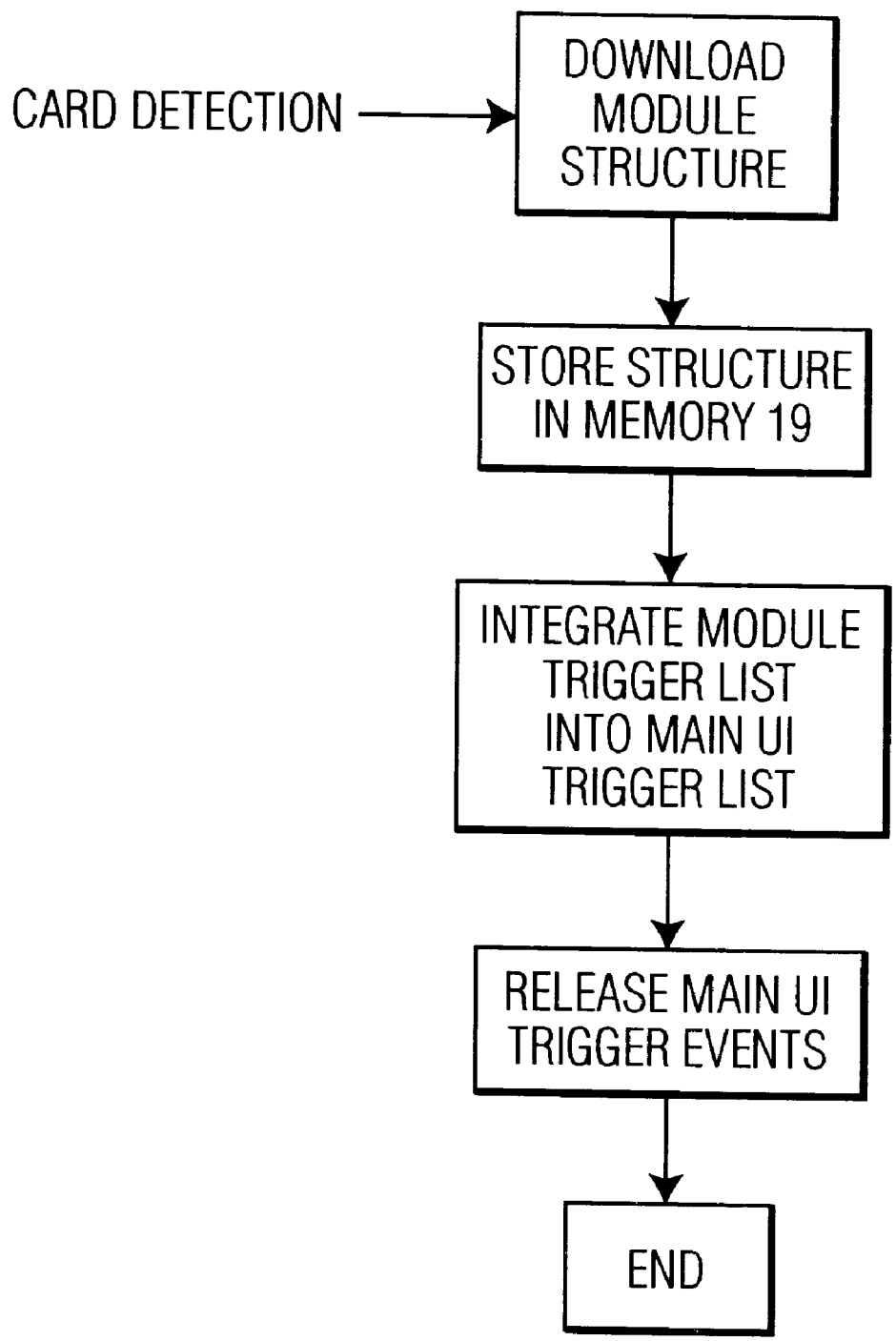

The integration of the user interface module into the main user interface is made according to the process described below and illustrated by the flowchart of FIG. 4.

According to the present embodiment, the integration takes place either when the smart card is inserted into the smart card interface or when the decoder is turned on and detects the card's presence. The detection of the insertion or presence of the card is made in a known way by polling the state of a switch located in the slot of the card interface and triggered by the card's edge.

The decoder then requests the transfer of the entire user interface module structure, which is stored in memory 19. Transferring the entire structure at once reduces the amount of data to be transferred when the user actually navigates in the user interface. Data exchange with the smart card is then limited to reading and writing parameters and variables, instead of also transferring user interface structure information. Reduction of the amount of data exchange is important to improve system response times to user commands because smart card interfaces are often serial interfaces with data transfer rates limited to a few kilobauds per second.

To facilitate the exchange of data relating to the user interface module, the data structures mentioned above are coded under a Type, Length and Value format (TLV format), where:

"Type" is a byte indicating the type of a structure;
"Length" is a two-byte word giving the length of the "Value" field and
"Value" is a series of data bytes in conformance with the data structures given above. The Value field of a TLV structure may include one or several TLV structures.

The "Type" values used are the following:

| | |
|---|---|
| UserInterfaceModule | 00 |
| UIList | 01 |
| Screen | 02 |
| Menu | 03 |
| Choice | 04 |
| VariableField | 05 |
| InputField | 06 |
| ExplanatoryText | 07 |

Once the user interface module structure has been transferred, the decoder checks which trigger values are contained in the screens of the module. It then makes a list of the possible entry points into the module screens. In this particular embodiment, there is only one trigger value (i.e. 2) defining an entry point into the user interface module, since the only authorized access is through the Conditional Access Main Screen. Of course, more than one entry point may be defined.

The decoder checks which Choice structures of the main user interface (or of a previously integrated module) make reference to the trigger values defining an entry point into the module which has been loaded. In this particular case, this is the Choice structure corresponding to the "Conditional Access" item in the main user interface main menu. This Choice may from now on be activated by the user.

Once the user interface module has been integrated into the main user interface, the communication of parameters and values of variables between the decoder and its main user interface and the smart card is made using two dedicated functions: CardRetrievalFunction and CardWriteFunction. A specific pointer is associated with each function. The program code for each function is stored in the smart card and executed by the smart card's microprocessor. Code execution is triggered by the decoder by sending a function pointer along with the appropriate data to the card. The functions have a role similar to that of the "GetValue" and "ProcessValue" functions described above, except that in this case, the data is not stored in the decoder's internal memory but in the smart card's memory.

To obtain for example the current value of a password, the decoder sends the pointer "CardRetrievalFunctionPointer" as a command to the smart card, along with a pointer identifying the variable whose value is to be retrieved.

The Card Retrieval Function is called whenever an object structure of the Variable Field type is encountered in a screen to be displayed.

To write a password value to the card, the decoder sends the "CardWriteFunctionPointer" as a command to the smart card, along with a pointer identifying the variable whose value is to be written to the card, and the new value of this variable.

The function pointers and variable pointers are part of the data transferred from the smart card to the decoder when the module structure is transferred.

When a screen is to be displayed, the decoder will call the Card Retrieval function as many times as required to fill the variable fields on the display with the proper values. According to a variant of the present embodiment, the function calls requesting the value of a variable field are made only when all other elements of a screen have been displayed. According to another variant of the present embodiment, a function call requesting the value of a variable field from the card is made for at least some of these fields only when the user activates the corresponding object on the screen. This applies for example to data which is seldom needed by the user, and increases the overall display speed of the user interface screens.

According to the embodiment described above, the main user interface is conceived to comprise the objects which are potential bridges to the user interface module to be integrated. The manipulation of such objects by the user is limited until the integration of the module has taken place.

According to a variant of said embodiment, the main user interface does not include such objects in advance. In this case, the smart card not only contains the structure of the user interface module, but also the structure of several objects which will enable the user to access this module once integrated into the main module.

When the decoder downloads the module structure from the smart card, it also transfers the further structures, which make reference to the structures of the main user interface.

In the first embodiment, the option "Access Control" was displayed in the main menu of the decoder's main user interface, although this option was not available before the integration of the user interface module. According to the further embodiment, this option does not exist in the main user interface. The structure of "Choice" type corresponding to this option is stored on the smart card. The smart card also contains information indicating that this "Choice" structure is to be inserted into the Menu structure of the main user interface, thus adding the option to the list of items of the main user interface's main menu.

According to a third embodiment, said main user interface and said user interface module are called by the user using separate commands or keys. In this case, there is no need to have an option of the main user interface giving access to the screens of the module. The user interface module may then be run in parallel with the main user interface. The relation established between the main user interface and the module is then limited to freeing access, by the main user interface, to the module once it is loaded.

What is claimed is:

1. A method for loading a user interface in a television system comprising a decoder and a removable smart card cooperating with said decoder, said decoder comprising a main user interface, said method comprising the steps of:

loading and storing by the decoder of the totality of a user interface software module stored on said smart card, said user interface module comprising data structures making reference to information destined to a user, said information being stored on said smart card;

establishing by said decoder a relation between said main user interface and said stored user interface module in order to enable access by a user to said user interface module, said step of establishing said relation between said main user interface and said user interface module comprising the step of identifying at least one entry point into said user interface module; and subsequently exchanging between said decoder and said smart card parts of said information upon commands issued by said user through said user interface module.

2. The method according to claim 1, wherein the step of loading and storing is performed upon the first detection by said decoder of the presence of a smart card.

3. The method according to claim 1 further comprising displaying to said user in said main user interface an access to said user interface module through said at least one entry point.

4. The method according to claim 1 wherein said information comprises user-defined data.

5. The method according to claims 1 wherein said user interface module is stored under the form of at least one linked list of objects.

6. The method according to claim 5 wherein said at least one linked list of objects comprises a series of screens, at least one screen in each linked list comprising one of said entry points.

7. The method according to claim 3, wherein said main user interface comprises a predetermined pointer to said at least one entry point, and wherein said step of establishing by said decoder a relation between said main user interface and said user interface module further comprises the step of allowing said user to activate a trigger to access said entry point only when said user interface module has been loaded.

8. The method according to claim 3, wherein said step of establishing a relation between said main user interface and said user interface module further comprises the step of loading from said smart card at least one object to be linked to an object of said main user interface.

9. A smart card comprising a memory, a microprocessor and input/output means containing data destined to a user, a user interface software module to present said data to said user and data identifying the relation between said user interface module and a main user interface software module of a device into which said smart card is inserted, said user interface software module comprising at least one entry point that establishes a link with another software module.

10. A video receiver comprising a main user interface, a memory, a memory card interface and a device for entering user commands, comprising:

means for downloading the totality of a user interface module stored in a memory card inserted into said memory card interface;

a memory for storing said user interface module; and means for establishing a relation between said main user interface and said user interface module, said means for establishing said relation between said main user interface and said user interface module comprising at least one entry point into said user interface module.

11. A method for displaying menu information for selection by a user, said method comprising:

displaying via a user interface in a decoder a selection of menu choices, said menu choices associated with information stored in said user interface;

integrating a smart card having a user interface into the decoder; and displaying additional menu choice selections responsive to user activation of a given menu choice from said selection of menu choices and to said integrated user interface containing said additional menu choice selections.

* * * * *